United States Patent
Buchal et al.

[11] Patent Number: 5,900,057
[45] Date of Patent: May 4, 1999

[54] PLANAR WAVEGUIDE AND A PROCESS FOR ITS FABRICATION

[75] Inventors: Christoph J. Buchal, Julich, Germany; Theo Siegrist, Neshanic Station, N.J.

[73] Assignee: Lucent Technologies Inc., Murray Hill, N.J.

[21] Appl. No.: 08/658,419

[22] Filed: Jun. 5, 1996

Related U.S. Application Data

[62] Division of application No. 08/373,346, Jan. 17, 1995, Pat. No. 5,555,342.

[51] Int. Cl.$^6$ .................................................. C30B 29/12
[52] U.S. Cl. ........................... 117/109; 117/84; 117/105; 117/108; 117/918; 117/940
[58] Field of Search ........................ 117/84, 105, 108, 117/109, 918, 940

[56] References Cited

U.S. PATENT DOCUMENTS

| | | | |
|---|---|---|---|
| 5,119,460 | 4/1992 | Bruce et al. | 385/142 |
| 5,140,658 | 4/1992 | Sunshine | 385/49 |
| 5,240,885 | 8/1993 | Aiken et al. | 501/40 |
| 5,248,890 | 6/1993 | Luth et al. | 257/102 |
| 5,290,730 | 3/1994 | McFarlane et al. | 423/489 |
| 5,379,311 | 1/1995 | McFarlane et al. | 372/41 |

*Primary Examiner*—Robert Kunemund
*Attorney, Agent, or Firm*—Richard J. Botos

[57] ABSTRACT

A planar waveguide and a process for making a planar waveguide is disclosed. The waveguide has a layer of dope host material formed on a substrate. The host material is a trivalent material such as a metal fluoride, wherein the metal is selected from the Group III B metals and the lanthanide series rare earth metals of the Mendeleevian Periodic Table. The dopant is a rare earth metal such as erbium. The waveguide has an emission spectrum with a bandwidth of about 60 nm for amplification of an optical signal at a wavelength of about 1.51 $\mu$m to about 1.57 $\mu$m. The waveguide is made by forming the layer of doped host material on a substrate. The film is formed by evaporating materials from two separate sources, one source for the dopant material and a separate source for the host material and forming a film of the evaporated materials on a substrate.

8 Claims, 2 Drawing Sheets

PLANAR WAVEGUIDE AND A PROCESS FOR ITS FABRICATION

This is a division of application Ser. No. 08/373,346 filed Jan. 17, 1995, now U.S. Pat. No. 5,555,342.

FIELD OF THE INVENTION

This invention relates to optical amplifiers and, in particular, planar optical amplifiers involving rare earth doped materials.

ART BACKGROUND

Considerable recent research has involved the development of optical amplifiers useful in optical communications. Typically, these amplifiers involve a waveguide formed in a glassy material (a material that has no long-range ordering and is characterized by an absence of Bragg peaks in X-ray diffraction and/or a glass transition observed in differential scanning calorimetry) with a rare earth dopant present in the waveguide core and with a region of lower refractive index surrounding the core. Generally, the glassy host material does not substantially affect the emission spectrum of the dopant, and the rare earth dopant material is chosen to have a spectral emission line corresponding to a wavelength at which optical communication is to be performed. For example, most long-haul optical communication is performed either at 1.3 $\mu$m or 1.55 $\mu$m. Optical devices that amplify signals at 1.3 $\mu$m are described in U.S. Pat. No. 5,140,658 to Sunshine et al.

Optical amplifiers at 1.55 $\mu$m have been demonstrated and are described in U.S. Pat. No. 5,119,460 to Bruce et al. These amplifiers involve a waveguide fiber having erbium, that emits at 1.52 to 1.56 $\mu$m, present in the core at concentrations typically in the range 10 to 1000 parts per million. During operation of the amplifier, optical power at a wavelength 0.975 or 1.48 $\mu$m is introduced into the waveguide core along with a signal at the 1.55 $\mu$m wavelength. The optical power induces a transition in the erbium that populates a state, the $^4I_{13/2}$ state, capable of stimulated emission around 1.55 $\mu$m, and the signal induces this transition from the populated state. Thus, the output from the amplifier involves a signal at 1.55 $\mu$m that has an intensity approaching that of the combined power and signal inputs. In his manner, an optical signal is amplified, in contrast to electrical amplification involving conversion of the optical signal to an electrical signal, followed by electrical amplification and another conversion back to an optical signal.

The concentration of the dopant affects the efficiency of the amplifier. Since the properties of the amplifier depend upon the absolute number of dopant atoms in the host material, the dopant concentration that is necessary for adequate performance depends upon the length of the device. For example, the dopant concentration in fiber amplifiers is much less than the dopant concentration in planar optical amplifiers, because fiber amplifiers are much longer than planar optical amplifiers. However, high dopant concentrations lead to concentration quenching of the luminescence from the dopant. If such quenching occurs, the amplifier gain is reduced and the amplifier performance is consequently degraded. Therefore, planar optical amplifiers that amplify signals at 1.55 $\mu$m and that overcome the problems associated with high dopant concentration, and a process for making such planar optical waveguides, are sought.

SUMMARY OF THE INVENTION

The present invention contemplates a planar optical waveguide that amplifies an optical signal at a wavelength from about 1.51 $\mu$m to about 1.57 $\mu$m. The planar optical waveguide contains a region suited for guiding the signal comprising a doped, waveguide host material. The waveguide host material is either a polycrystalline or a single crystalline material with trivalent cations. It is advantageous if the host material is a trivalent material such as a fluoride of a IIIB metal or a rare earth metal (lanthanide series) from the Mendeleevian Periodic Table. For example, the material is lanthanum fluoride ($LaF_3$), yttrium fluoride ($YF_3$), or lutetium fluoride ($LuF_3$). The waveguide host material is doped with other rare earth ions. It is advantageous if the dopant is erbium (Er).

It is advantageous if the dopant concentration in the host material is about 0.05 atomic percent to about 12 atomic percent in planar waveguides that are about 1 cm to about 20 cm in length. Since the concentration of dopant may vary through the thickness of the host material, it is advantageous if the maximum dopant concentration is within this range. In a preferred embodiment, the maximum dopant concentration is about 4 to about 5 atomic percent.

The dopant concentration through the thickness of the host material is either constant or varied. If varied, it is advantageous if the dopant profile matches the intensity profile of the light transmitted through the waveguide. In this regard, it is also advantageous if the maximum dopant concentration is at or near the center of the waveguide.

The amplifier of the present invention significantly amplifies a signal over a broad band. Significant amplification means that the intensity of the signal throughout the entire bandwidth is not less than one-third of the peak intensity. For example, the planar waveguide doped with erbium as previously described has an emission spectrum spanning a range from 1.51 $\mu$m to 1.57 $\mu$m in wavelength, giving a 60 nm bandwidth. Furthermore, the amplifier of the present invention provides an environment in which the lifetime of the spontaneous luminescent emission from the host material, as measured according to the description given below, is at least about 1 ms. Since longer lifetimes provide a better environment for signal amplification, it is advantageous if this lifetime is at least about 10 ms.

To fabricate the planar optical waveguide, a layer of waveguiding host material is formed on a substrate. The substrate has a refractive index that is lower than the refractive index of the waveguiding host material. If the substrate does not have a refractive index that is lower than the refractive index of the waveguiding host material, a buffer layer of a material with a suitable refractive index is formed between the substrate and the waveguiding host material. The planar waveguide is adapted to receive an optical signal and to receive power to amplify the optical signal. The waveguide is further adapted to output a signal that is an amplified input signal.

Examples of suitable substrates on which the host material is formed include single crystalline quartz substrates, fused quartz substrates, aluminum oxide substrates, calcium fluoride substrates or silicon substrates. Since it is advantageous if the substrate's coefficient of thermal expansion matches that of the waveguiding host material, single crystalline quartz substrates and aluminum oxide substrates are advantageous in this regard. If the substrate has a higher refractive index than the waveguide, a film that forms an optical buffer layer is formed on the substrate before the film of the host material is formed thereon. For example, if the substrate is a silicon substrate, the buffer layer is a material that has a refractive index lower than the refractive index of the waveguide. Silicon dioxide is an example of a suitable buffer layer material. The silicon dioxide layer is formed on the silicon substrate using conventional techniques.

The layer of doped host material is then formed on the substrate. It is advantageous if the trivalent host material and the dopant are deposited from separate sources, using conventional apparatus such as evaporation ovens, electron beam evaporators, and the like. In one embodiment, the trivalent host material is formed using $LaF_3$, $YF_3$ or $LuF_3$ as source material and the dopant is introduced using $ErF_3$ as source material. Sources and techniques for depositing films of the host and dopant materials specified above onto substrates are well known to those skilled in the art. It is advantageous if the temperature of the substrate during the formation of the doped, host material layer is about 300° C. to about 600° C.

The thickness of the host material layer so formed is a matter of design choice. Film thicknesses of about 0.8 $\mu$m to about 2 $\mu$m are contemplated as suitable. Film thicknesses greater than 2 $\mu$m are also contemplated to reduce coupling losses to fibers with larger cores.

Because independent sources are used for the layer of host material and the dopant material, the concentration of the dopant in the host material is widely variable. For example, it is contemplated that the maximum concentration of $ErF_3$ in $LaF_3$ host material is from about 0.05 atomic percent to about 20 atomic percent in the optical devices of the present invention. The concentration of the dopant is variable throughout the thickness of the layer of the host material in a particular device. As previously mentioned, if the dopant concentration varies through the thickness of the host material, then the maximum dopant concentration in the layer is found near the center of the waveguiding layer. Such a dopant profile is advantageous because the maximum mode intensity of the light occurs also at the center of the waveguide.

DETAILED DESCRIPTION

As discussed, the invention is directed to a planar waveguide which amplifies an optical signal at a wavelength of about 1.51 $\mu$m to about 1.57 $\mu$m. The present invention also contemplates a process for making such a waveguide.

The planar optical waveguide contains a region suited for guiding the signal comprising a layer of a doped host material. Er is an example of a suitable dopant.

The host material is chosen to match the valence state of the dopant, such that the dopant substitutes for a host cation rather than occupying interstitial sites. The symmetry of the site at which dopant atoms are introduced as well as the size and oxidation state of the host-constituent-atom being replaced by the dopant determines the allowed oxidation states of the dopant atoms. Site symmetries, exemplary host materials having those symmetries, and the other properties that lead to a desired oxidation state are well known and are tabulated in compendia such as *Laser Crystals*, Alexander Kaminskii, Springer-Verlag, 1981, and the *Major Ternary Structural Families*, Miller & Roy, Springer-Verlag, 1974.

Thus, for example, $Er^{3+}$ are maintained in this valence state by introduction into a film of a trivalent host material that is, for example, a fluoride of a IIIB metal or a rare earth metal from the Mendeleevian Periodic Table. Examples of these host materials include $YF_3$, $LaF_3$, and $LuF_3$. The structure of the host material is either single crystalline, polycrystalline or amorphous. Polycrystalline materials have certain processing advantages because they are more easily produced.

The gain of the amplifier is proportional to the concentration of the dopant in the host. Dopants are introduced in the concentration range of about 0.05 to about 12 atomic percent. Concentrations of less than about 0.05 atomic percent typically lead to undesirably low gain in the amplifier. Although concentrations above about 2 atomic percent are typically avoided because the possibility of concentration quenching is enhanced at these concentrations, the present invention contemplates dopant concentrations of up to about 12 atomic percent in the waveguiding host material. The problems associated with concentration quenching are reduced because the dopant is introduced substitutionally into the host material. Consequently, fewer charge compensating defects arise in these materials than in materials in which the dopant occupies interstitial sites in the host material. This in turn reduces the ion clustering, which would otherwise occur at such high dopant concentrations and which would deteriorate amplifier performance. In a preferred embodiment the dopant concentration is about 4 atomic percent to about 5 atomic percent.

Figure 1:
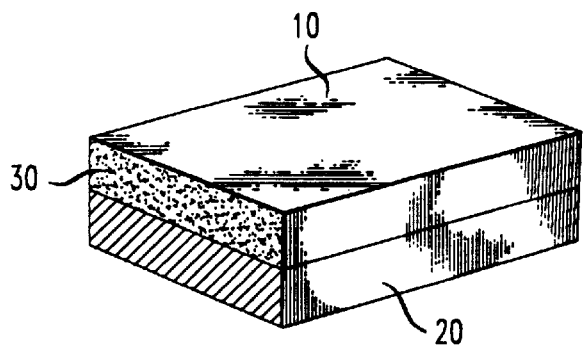
FIGS. 1 and 2 illustrate planar waveguides of the present invention.

The waveguides of the present invention are illustrated in FIGS. 1–4. FIG. 1 illustrates a planar waveguide 10 formed on a substrate 20. As indicated by the shaded area 30 the layer 10 is doped through its entire thickness. The layer 10 is formed directly on a suitable substrate 20. Quartz, fused quartz, aluminum oxide, silicon and calcium fluoride are examples of suitable substrate materials.

Figure 2:
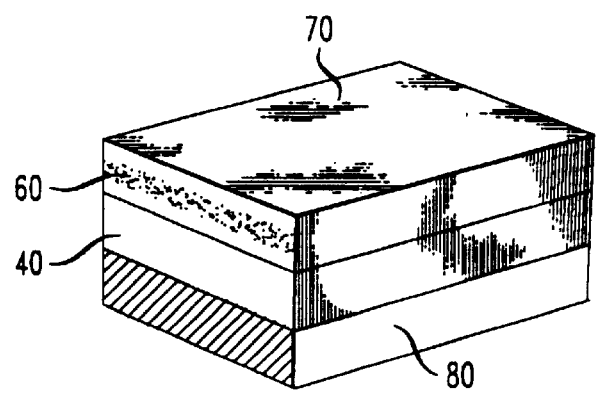

In the alternate embodiment pictured in FIG. 2, the waveguide has a buffer layer 40 formed between the substrate layer 80 and the waveguide material 70. The buffer layer 40 provides optical separation between the substrate 80 and the waveguide layer 70 when the refractive index of the substrate 80 is higher than that of the waveguide material 70. In such an instance, the buffer layer 40 is made of a material with an index of refraction that is lower than the index of refraction of the waveguide material 70. One skilled in the art will recognize that, to achieve optical separation, the index of refraction of the buffer layer need be only nominally lower than the index of refraction of the waveguide material. For example, if the substrate 80 is made of a material with a high index of refraction such as silicon, it is advantageous if the waveguide has a buffer layer. Silicon dioxide, which has an index of refraction that is lower than that of the trivalent host materials of the present invention, is an example of a suitable buffer layer material. FIG. 2 also depicts a waveguide in which the doping profile of the waveguiding material 70, indicated by the shaded area 60, varies through the thickness of the waveguiding layer.

The waveguide layer (10 in FIG. 1) is formed in one embodiment by placing the substrate in a chamber. The chamber is evacuated. Separate sources for the host and dopant materials are provided so that the amount of material from each source that is incorporated into the waveguide layer 10 is controlled. For example, the host and dopant material are each placed in a separate Knudsen oven that is commercially obtained from EPI of Saint Paul, Minn. The composition of the layer is controlled by controlling the amount of material that is evaporated from each source.

Increasing or decreasing the temperature of the oven in which the dopant source is placed will correspondingly increase or decrease the dopant concentration in the waveguide layer. The dopant concentration is varied through the thickness of the waveguide layer by modulating the temperature of this oven as the waveguiding layer is formed. A similar effect is obtained by individually controlling the oven shutters which controls the amount of material flowing from the oven and into the chamber.

In one embodiment wherein a waveguide layer with a composition of 5 atomic percent $ErF_3$ and 95 atomic percent $LaF_3$ is desired, the temperatures of the Knudsen ovens are adjusted so that for 5 units of $ErF_3$ evaporated, 95 units of $LaF_3$ are evaporated. To form a waveguide layer with this composition, the oven temperature for $LaF_3$ is set at about 1360° C. and the oven temperature for $ErF_3$ is set at about 1150° C.

Figure 3:
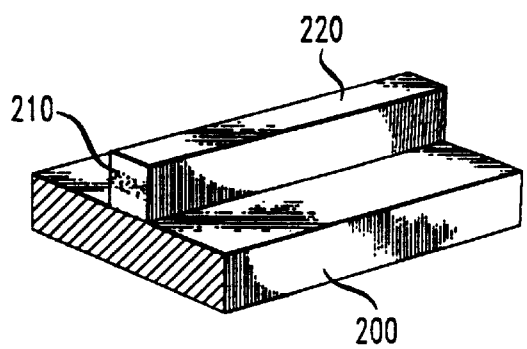
FIGS. 3 and 4 illustrate ridge waveguides of the present invention.
Figure 4:
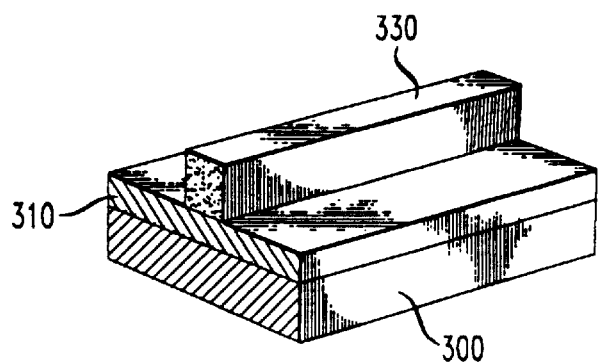

In an alternate embodiment, after the waveguide layer with the desired composition is formed on the substrate, the layer is patterned to form a ridge waveguide. Such a waveguide is illustrated in FIG. 3. To pattern the waveguide layer, a material such as a photoresist (not shown) is first formed on the waveguide layer. The photoresist is patterned by conventional techniques such as lithography in conjunction with etching to form the configuration shown in FIGS. 3 and 4. (Lithographic and etching techniques are described respectively in Nishihara et al., Optical Integrated Circuits, McGraw-Hill 1985). The ridge waveguide illustrated in FIG. 3 results when the waveguide layer is formed directly over the substrate 200 and patterned as described above to form a ridge 220. The ridge waveguide illustrated in FIG. 4 results when the ridge 330 is formed over a buffer layer 310, which is formed over a substrate 300.

In one embodiment of the present invention, the dopant concentration in the waveguide layer is uniform through the thickness of the waveguide layer. In an alternate embodiment, the dopant profile is matched to the intensity profile of the light that travels through the waveguide. In the latter embodiment the dopant profile through the waveguide is such that the maximum dopant concentration in the host material is found at a point about equidistant from the top and the bottom of the planar waveguide. This dopant profile is depicted as 60 in FIG. 2 and 210 in FIG. 3.

The resulting amplifiers are useful for amplification of signals associated with optical communications. Nevertheless, other applications such as high power optical amplifiers contemplated for use in cable television systems are possible and are not precluded. Insertion of signal and amplification power is accomplished by expedients such as described in *Integrated Optics Theory and Technology* by Hunsperger, Springer-Verlag, 1982. Output signals are coupled to the waveguide amplifier by methods such as those described in Hunsperger. Typical approaches for input and output coupling include the use of an input and output silica optical fiber butted to the waveguide region of the amplifier.

The following examples are illustrations of specific embodiments of the claimed invention.

EXAMPLE 1

A silicon wafer with a 10 μm thick layer of silicon dioxide formed thereon was placed in a vacuum chamber. The chamber was evacuated to a pressure of about $10^{-9}$ Torr. Sources of $LaF_3$ and $ErF_3$ were each placed in a separate Knudsen ovens (EPI, St. Paul, Minn.). The ovens were heated to a temperature of about 1360° C. for $LaF_3$ and 1150° C. for $ErF_3$. The pressure during the deposition was maintained at or below $10^{-7}$ Torr. During deposition the temperature of the ovens was controlled by a closed loop feedback system, using a tungsten/rhenium thermocouple. For a uniform composition throughout the film, the temperatures of the Knudsen cell ovens were kept constant during the formation of the layer. The resulting film had a composition that was about five mole percent $ErF_3$ and 95 mole percent $LaF_3$ uniformly throughout the layer.

The substrate temperature was held at about 550° C. The resulting film thickness was about 0.8 μm. The film thickness was measured using a DEKTAK™ instrument. The composition and film thickness were independently determined using Rutherford Backscattering Spectrometry. The resulting films were polycrystalline.

Figure 5:
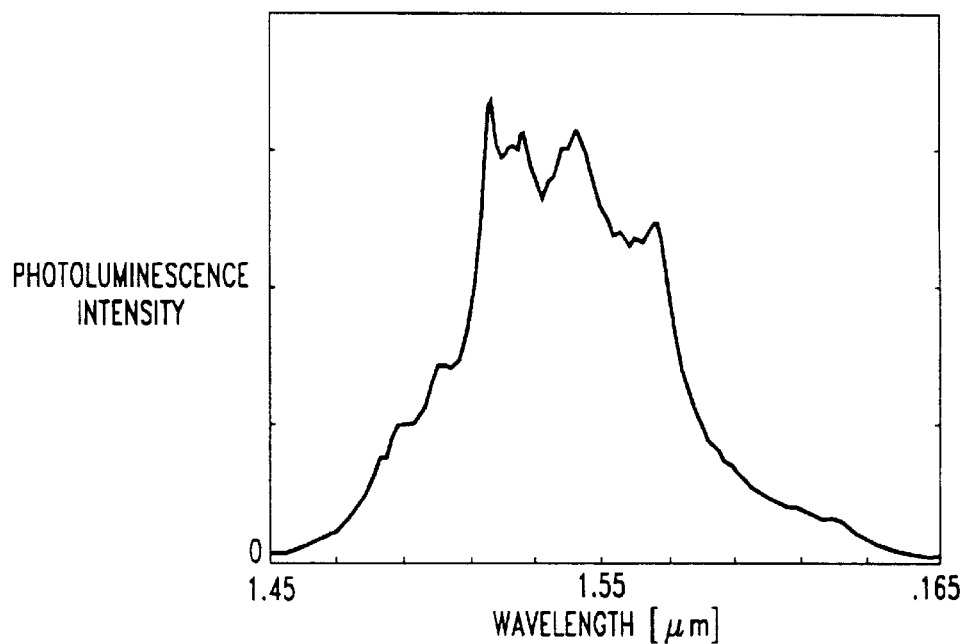
FIG. 5 illustrates a photoluminescence spectrum of a waveguide of the present invention.

The resulting waveguides transmitted signals with wavelengths of about 0.20 μm to about 20 μm. A photoluminescence spectrum of a planar waveguide was measured using the 514.5 nm line of an argon laser, with a power of about 400 mW and a beam diameter of about 0.5 mm. The luminescence was spectrally analyzed with a single-grating monochromator, and the signal was detected with a liquid nitrogen cooled germanium detector. The pump beam was chopped at a frequency of 11 Hz, and the signal was amplified using a lock-in amplifier. The photoluminescence is depicted in FIG. 5 as a function of wavelength. As demonstrated by FIG. 5, the planar amplifier significantly amplified signals in the band of about 1.51 μm to about 1.57 μm. Thus the amplifier demonstrated a broad (about 60 nm) bandwidth of significant amplification.

Figure 6:
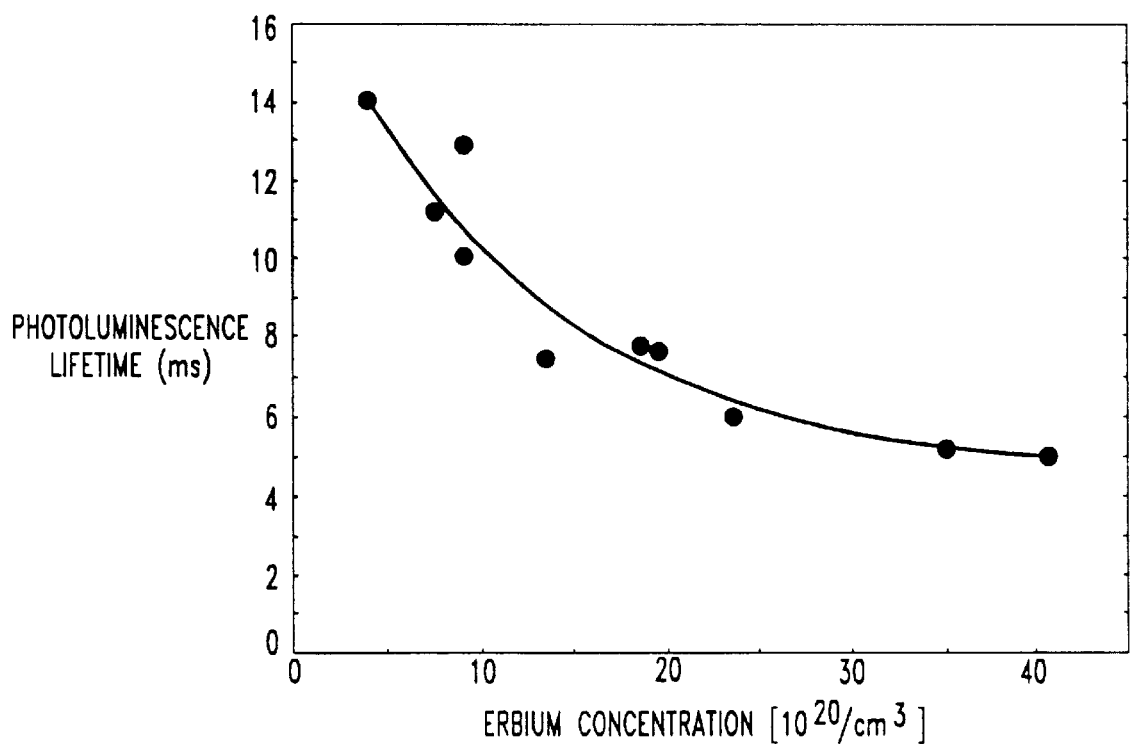
FIG. 6 illustrates an emission lifetime of a waveguide of the present invention.

The lifetime of the luminescence as a function of the concentration of the dopant in the film was measured by monitoring the decay of the luminescence of the waveguide layer made according to the above example after switching off the light source used to photo-excite the films. These lifetimes as a function of Er concentration in the film are illustrated in FIG. 6. The measured lifetime of the luminescence in a film that contained 5 atomic percent Er decayed exponentially with a time constant of 12.8 ms. This relatively long lifetime illustrates that the waveguide layer provides a good environment for amplification.

We claim:

1. A process for fabricating a planar waveguide comprising:

forming a layer of a doped, waveguiding host material and a dopant material on a substrate by evaporating the host material from a first source and the dopant material from the second source, wherein the first source material is a metal fluoride wherein the metal is selected from the group consisting of the Group IIIB metals and the lanthanide series rare earth metal of the Mendeleevian Periodic Table of the Elements and the second source material is $ErF_3$.

2. The process of claim 1 wherein the concentration of the dopant in the host material is about 0.05 atomic percent to about 5 atomic percent.

3. The process of claim 1 wherein the dopant is erbium and the doped, waveguiding host material has an emission spectrum with a bandwidth of about 60 nm at a signal wavelength of about 1.51 μm to about 1.57 μm.

4. The process of claim 1 further comprising controlling the dopant concentration in the doped, waveguiding material such that the dopant profile conforms to the intensity profile of the light transmitted through the doped, waveguiding material.

5. The process of claim 3 wherein the first source material is selected from the group consisting of $LaF_3$, $YF_3$, and $LuF_3$.

6. The process of claim 5 wherein the doped, waveguiding material is formed on the substrate by heating a source of $LaF_3$ to a first temperature and heating a source of $ErF_3$ to a second temperature wherein the first and second temperatures are selected to control the rates of evaporation of $LaF_3$ and $ErF_3$ from their respective sources such that for every 5 units of $ErF_3$ that are evaporated, 95 units of $LaF_3$ are evaporated thereby forming a doped waveguiding material that is about 95 atomic percent $LaF_3$ and about 5 percent $ErF_3$ on the substrate.

7. The process of claim 6 wherein the substrate is selected from the group consisting of silicon, crystalline quartz, fused quartz, calcium fluoride, and aluminum oxide.

8. The process of claim 7 wherein the silicon substrate has a buffer layer of silicon dioxide formed thereover before the layer of doped, waveguiding material is formed on the substrate.

* * * * *